Feb. 11, 1936.  O. GEISLER  2,030,443
SOLID RECTIFYING ELEMENT
Filed July 19, 1934
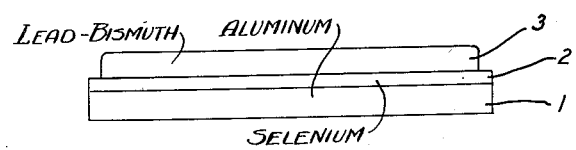
INVENTOR
O. GEISLER
BY Walter C. Kiesel
ATTORNEY Patented Feb. 11, 1936

2,030,443

UNITED STATES PATENT OFFICE 2,030,443

SOLID RECTIFYING ELEMENT

Ottmar Geisler, Nuremberg, Germany, assignor to Western Electric Company, Incorporated, New York, N. Y., a corporation of New York Application July 19, 1934, Serial No. 736,043
In Germany March 15, 1934

11 Claims. (Cl. 175—366)

Dry metal rectifiers built up in layers are known in which a semi-conductor layer of selenium or a selenium compound is located upon a mounting plate of a metal of the iron group and in which a counter-electrode, for instance, composed of a lead-bismuth composition is located over this layer of selenium. In order to assure a perfect operation of a selenium rectifier built up in this manner, it is important that the layer of selenium be strongly attached to the metallic mounting plate by a melting process and that in turn it be converted into the crystalline condition by means of a certain heating process. The selenium crystals produced according to this method are grown into the mounting plate. In the known selenium rectifiers the lead-bismuth electrode situated over the layer of selenium is either pressed onto this layer or it is sprayed upon it.

Such a selenium rectifier plate has in the direction of the mounting plate—selenium layer-top electrode a considerably lower resistance than in the opposite direction.

By adding earth metals or compositions of earth metals or also by adding alkaline metals or compositions thereof to the layer of selenium it is possible to increase considerably the rectifying effect of the selenium rectifier. The inner resistance of the rectifier is also decreased by these admixtures, so that it will be possible to load the rectifiers considerably higher per unit area.

The present invention represents an improvement over the known selenium rectifier. The improvement consists in the fact that a plate of light metal, especially a plate of aluminum, is used as a mounting plate for the rectifier.

Referring now to the drawing, 1 is a plate or electrode of light metal, for instance, aluminum, 2 is the rectifying layer of selenium strongly attached to the preferably roughened surface of the aluminum plate which may be coated with a metal of the iron group, and 3 is a plate or electrode, for instance, of lead-bismuth, pressed onto or sprayed upon the selenium layer.

Especially good selenium rectifiers are obtained if the aluminum plate is made rough by a mechanical or chemical process before melting onto it the layer of selenium and if it is coated with a metal of the iron group.

The main advantage in using aluminum plates instead of the iron plates used heretofore lies not only in the fact that its weight is considerably less but also in that conductivity of these plates is higher.

The higher conductance of the aluminum makes possible a higher current carrying capacity of the rectifier plates. Consequently with equal power a valve will require fewer plates constructed in accordance with the present invention than it would use of the plates known heretofore. Due to the smaller number of plates and due to the lighter weight of the rectifier plates according to the invention a very considerable reduction in weight is accomplished for the completed rectifier.

What is claimed is:

1. An alternating current rectifier of the type having a rectifying layer of selenium between and intimately attached to a pair of electrodes, in which one electrode is of aluminum.

2. An alternating current rectifier of the type having a rectifying layer of selenium between and intimately attached to a pair of electrodes, in which one electrode is of aluminum, said one electrode being roughened on its surface making intimate contact with the selenium layer.

3. An alternating current rectifier of the type having a rectifying layer of selenium between and intimately attached to a pair of electrodes, in which one electrode is of aluminum, said one electrode being coated with a metal of the iron group.

4. An alternating current rectifier of the type having a rectifying layer of selenium between and intimately attached to a pair of electrodes, in which one electrode is of aluminum, said one electrode being roughened on its surface making intimate contact with the selenium layer and being coated with a metal of the iron group.

5. An alternating current rectifier of the type having a rectifying layer of selenium between and intimately attached to a pair of of electrodes, in which one electrode is of aluminum and said layer is of impure selenium.

6. An alternating current rectifier of the type having a rectifying layer of selenium between and intimately attached to a pair of electrodes, in which one electrode is of aluminum and said layer contains an impurity comprising an earth metal.

7. An alternating current rectifier of the type having a rectifying layer of selenium between and intimately attached to a pair of electrodes, in which one electrode is of aluminum and said layer contains an impurity comprising an alkaline metal.

8. An alternating current rectifier comprising an electrode of aluminum, and a rectifying layer comprising selenium intimately attached to said electrode.

9. An alternating current rectifier comprising an electrode of aluminum having a roughened surface, and a rectifying layer comprising selenium intimately attached to said roughened surface.

10. An alternating current rectifier comprising an electrode of aluminum coated with a metal of the iron group, and a rectifying layer comprising selenium intimately attached to said electrode.

11. An alternating current rectifier comprising an aluminum electrode having a surface roughened and coated with a metal of the iron group, a rectifying layer comprising selenium intimately attached to the coated electrode, and an electrode of lead-bismuth in intimate contact with said layer.

OTTMAR GEISLER.